United States Patent [19]

Houston et al.

[11] 4,410,895

[45] Oct. 18, 1983

[54] INK JET SENSOR METHOD AND APPARATUS

[75] Inventors: Robert D. Houston, Marion; Frank J. Liptak, Webster, both of N.Y.

[73] Assignee: Xerox Corporation, Stamford, Conn.

[21] Appl. No.: 314,634

[22] Filed: Oct. 26, 1981

[51] Int. Cl.[3] .......... G01D 15/18

[52] U.S. Cl. .......... 346/1.1; 346/75

[58] Field of Search .......... 346/1.1, 75, 140

[56] References Cited

U.S. PATENT DOCUMENTS

| | | | |
|---|---|---|---|
| 3,737,914 | 6/1973 | Hertz | 346/75 |
| 3,769,627 | 10/1973 | Stone | 346/75 |
| 4,112,469 | 9/1978 | Paranjpe et al. | 346/75 X |
| 4,238,804 | 12/1980 | Warren | 346/75 |
| 4,255,754 | 3/1981 | Crean et al. | 346/75 |

*Primary Examiner*—Donald A. Griffin

[57] ABSTRACT

In an ink jet printer, improved ink droplet sensing method and apparatus. The disclosed full width ink jet printer includes a number of ink jet nozzles which direct ink droplets to specific regions of a print plane. The present sensing technique insures ink drops from the multiple nozzles "stitch" together properly across the printing plane. Multiple sensing sites (two for each nozzle) are comprised of a light input optical fiber and two output fibers coupled to circuitry to monitor light intensity at the sensing site. The sensitivity of the site is enhanced by electroformed input and output masks which reduce the effective send and receive area of the optical fibers.

6 Claims, 5 Drawing Figures

INK JET SENSOR METHOD AND APPARATUS

BACKGROUND OF THE INVENTION

1. Field of the Invention

The present invention relates to ink jet printing and more particularly relates to ink droplet sensing method and apparatus.

2. Prior Art

As is known in the art, ink jet printing is a form of non-impact printing wherein ink droplets are caused to impinge upon a recording medium such as paper or the like. A typical ink jet system includes a droplet generator which starts a stream of ink along an initial trajectory, a transport for moving paper past the generator to allow droplets to impinge upon the paper, and a means for directing the ink droplets to impinge upon specific paper locations, thereby encoding the paper with information. According to one ink jet system, ink droplets are continuously generated at a fixed frequency along a trajectory toward the recording medium. The continuous drop system also includes a gutter to catch those droplets which are not to impact the paper. The trajectory of the droplets is determined at the point of droplet break-off by placing a selected net charge on the droplet. In this way, some droplets contact the paper at appropriate positions and other droplets strike the gutter and are recirculated for subsequent use.

Within the so called continuous drop subset of ink jet printers, there exists a variety of architectures. One architecture, for example, comprises a single drop generator nozzle which traverses back and forth across the ink jet page as droplets are generated. Other architectures include multiple nozzles each of which direct ink droplets to selected portions of a paper width.

One multiple nozzle architecture known in the art makes particular use of the present droplet sensing method and apparatus. According to that architecture, the droplets are charged both positively and negatively to varying degrees depending upon the desired droplet trajectory. A deflection field located downstream from the droplet break-off point interacts with the positively and negatively charged droplets to deflect them away from their initial trajectory in a direction transverse to a direction of paper movement. Each of the multiple ink jet nozzles of this system throws droplets to a specific portion of the paper width and when the printer is functioning properly, the ink droplets from the multiple nozzles "stitch" together at stitch points across this width. In this system, the gutter droplets are more highly charged so that they deflect a large amount away from their initial trajectory to gutters comprising part of the drop deflection apparatus. Further details regarding this type of ink jet printer quite similar to this architecture can be obtained by reference to U.S. Pat. No. 4,238,804 to Warren entitled "Stitching Method and Apparatus For Multiple Nozzle Ink Jet Printer".

As droplets are generated and deflected along varying trajectories to the paper or the gutter, there is a need to check the performance of the ink jet generator, charging electrode and deflection field. This checking process must be performed periodically so that the calibration of the printing system never deteriorates. One particularly important feature in the ink jet process is the stitching together of drops from the nozzles along the ink jet array. Neither droplet overlap nor gaps between nozzles can be permitted if the ink jet printing image is to be uninterrupted across the paper width. For this reason, it is important that some sensing of droplet trajectory be conducted to insure that droplets are responding to the charging and deflection in a desired manner.

Prior art drop sensors are known. One such sensor is disclosed in U.S. Pat. No. 4,255,754 to Crean et al assigned to the Xerox Corporation, assignee of the present invention and incorporated herein by reference. Apparatus disclosed in that patent includes a light source and light sensor mounted on opposite sides of a droplet trajectory. The sensor interprets changes in light intensity transmitted by the light source to sense both the presence of ink droplets and to determine their speed of travel to the recording medium. U.S. Pat. No. 4,344,078 to Houston filed Nov. 6, 1980 and issued on Aug. 10, 1982 discloses one method for practicing the sensing technique disclosed in the Crean et al patent. According to the method disclosed in that application, the light source and light receiver include optical paths which are photo-fabricated to a support substrate. The present invention comprises an alternate drop sensing method and apparatus which offers ease in sensor fabrication and improvements in drop sensing sensitivity.

SUMMARY OF THE INVENTION

The present invention comprises structure for sending and receiving light signals to monitor droplet travel from a drop generator to a print medium. The structure can be easily fabricated and maintained while offering a high degree of droplet sensing sensitivity that is required where the sensor is used in stitching together droplets from a multi nozzle ink generator.

The invention has particular utility when used in conjunction with an ink jet printer having multiple nozzles for directing a number of ink streams toward a recording medium. The apparatus includes optical light fibers for directing light to a number of sensing positions along the width of the printer so that droplets following certain trajectories intercept this light in a region of high light intensity. Additional output fibers are positioned in spaced relationship to the input fibers for detecting changes in light intensity caused by passage of the droplets past the sensing position. Additionally, masks are interposed between the input and output light fibers in the regions of ink droplet travel to mask light and define optical sending and receiving sites having an area less than the fibers which they mask.

Use of the optical masking technique allows utilization of bulk optic fibers having a cross sectional dimension greater than the dimension required by the ink droplet sensing apparatus. These bulk fibers can be easily routed away from the sensing sites and can be flexed and bent as needed to route them to light intensity detecting circuitry. According to a preferred embodiment, the masking of these fibers is accomplished by positioning electroformed metal masks over the end surface of these output fibers. The light transmitting regions as defined by these masks are separated along the dimension of the path of travel while being closely spaced in the direction of droplet deflection. This closely adjacent positioning of output fibers enhances sensing sensitivity to aid in the stitching together of ink droplets in a printing array. The fiber separation in the direction of drop travel eases sensor assembly.

According to one assembly technique, the input and output fibers are mounted to a mounting plate through which mounting holes are drilled. The optical fibers are inserted through the plate and then secured in place by a potting compound which firmly secures the fibers to the plate without limiting bending or flexing of the optical fibers.

From the above, it should be appreciated that one object of the present invention is the provision of a structurally sound yet optically sensitive ink jet droplet sensor for sensing ink drops during their trajectory toward a recording medium. Other objects, features and advantages of the present invention will become better understood when a preferred embodiment of the present invention is described in conjunction with the accompanying figures.

DETAILED DESCRIPTION OF THE INVENTION

Figure 1:
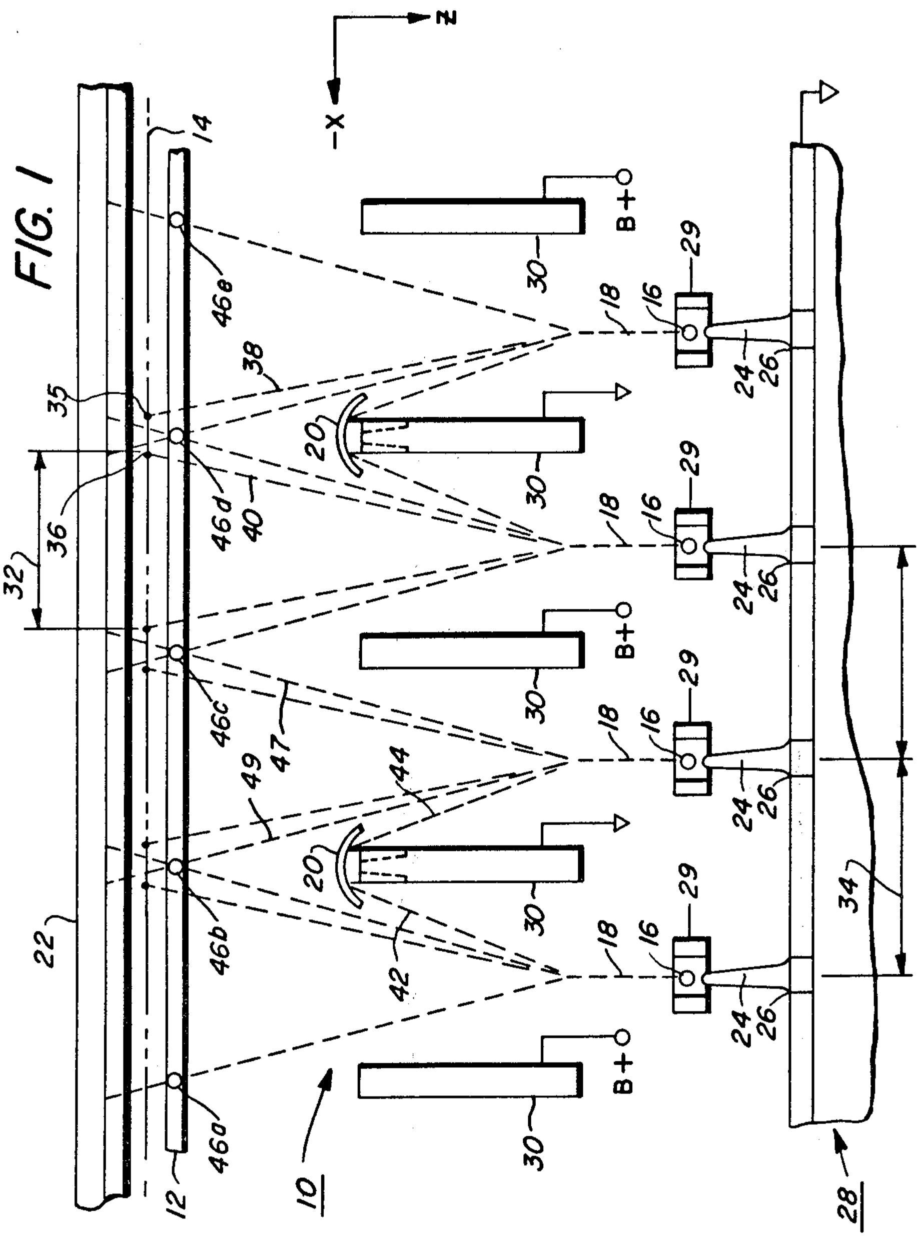
FIG. 1 is a schematic plan view of a portion of an ink jet printer.

Turning now to the drawings, FIG. 1 illustrates a liquid drop printer 10 using a sensor array constructed according to the present invention. The sensing array 12 is a device for detecting the location of drops in flight relative to the coordinates of an x, y and z orthogonal coordinate system. As used herein, the drops are in flight generally parallel to the z axis. A plurality of drop streams are described which are all directed to the same x-y print plane. Printing is done in a raster pattern comprising multiple scan lines or print lines of pixels. A single drop is placed onto a single pixel. The role of the sensor is to insure that the drop placement relative to the pixels within a scan line are accurate. That is, any errors in drop placement detected by the sensor are correctable.

The scan or print lines are deposited onto a target along the x axis while the target and drop streams move relative to each other along the y axis. The relative movement gives rise to the two dimensional raster image composed of multiple, parallel print lines. The presence or absence of a liquid drop at each pixel is the means by which an image is constructed.

The system of FIG. 1 is especially benefited by the present invention. It is of a type similar to the printing system described by W. Thomas Warren in U.S. Pat. No. 4,238,804 filed Feb. 28, 1979 and issued Dec. 9, 1980. In the Warren patent, a plurality of drop streams can collectively deposit drops at all the pixels within a scan line. The segments must be aligned to each other to create a continuous scan line across the target. The Warren patent discloses the use of an array of drop position sensors to insure the segments "stitch" together.

As seen in FIG. 1, the sensing array 12 is positioned close to a print line 14 on a target. Liquid drops 16 in a drop stream represented by the dashed lines 18 fly toward the target to strike a given pixel within a print line or to be deflected into a print gutter 20. A test gutter 22 is located downstream of the target whereas the print gutters 20 are located upstream of the target. In the embodiment of FIG. 1, the sensor array 12 is normally employed only when the target is removed from the vicinity of the test gutter. The sensors are used to calibrate or adjust various system parameters affecting the drops 16. The drops are continuously generated from a liquid column 24 in a manner predicted by Lord Rayleigh. The column of liquid is issued from nozzles 26 in the drop generator 28. The generator includes a piezoelectric transducer coupled to the liquid in the generator. The piezoelectric transducer creates pressure variations within the liquid at a given frequency. These pressure variations in turn cause the drops 16 to form at the same rate, at a fixed distance from a nozzle 26 and with a uniform size and spacing.

A number of charging electrodes 29 (one for each drop stream) are located at the region of drop formation near the end of column 24. A voltage applied to an electrode 29 induces charge in the liquid column 24 which is trapped in a drop 16 when the drop breaks away from the column. Typically, the liquid is electrically grounded through the body of the generator 28.

Charged drops are deflected approximately in the x-z plane by an electrostatic field established between adjacent deflection electrodes 30. The drops in the embodiment of FIG. 1 are deflected either to the print gutter 20 or to a pixel within the scan line 14 at the target. The deflection field is created between the deflection electrodes 30 by the ground and +B potentials coupled to the electrodes.

During a printing operation, voltages are applied to the charging electrodes 29 to affect a sequential positioning of printed drops within the length 32 of the segments within the scan line 14. The points 35 and 36 represent adjacent pixels in the scan line located in adjacent segments. Pixel 35 is addressed by a drop trajectory 38 from the rightmost drop stream and pixel 36 is addressed by a drop following a trajectory 40 from the neighboring stream to the left. In a raster image printing system like that of FIG. 1, it is essential that the drops from adjacent streams are "stitched", that is, aligned to the ideal pixel locations within the scan line 14. Drops not intended for the target during a printing operation are charged to a level causing them to follow a trajectory intersecting a print gutter 20. The trajectories 42 and 44 are those followed by gutter drops in the two leftmost streams and are typical for other streams. Zero charge level drops fly a path to the trajectory unaffected by the deflection field between plates 30. However, the zero charge level is not used unless it results in placement of a drop at one of the evenly spaced pixels within scan line 14.

The sensor array 12 is used for drop stitching. The array is an assembly including a plurality of drop sensor sites **46*a–e* spaced apart a fixed distance apart along the sensor array. The sensor spacing is equal to that of the nozzle to nozzle spacing 34. The sensor positioning is chosen so that each drop stream can have drops deflected to trajectories over two sensor sites. This is important for the stitching operation. A drop can be charged, for example, to a voltage causing it to fly through a trajectory 47 over sensor 46*c*. Similarly a drop can be charged to cause it to follow a path 49 over sensor 46*b*. The electrostatic deflection process is approximately linear. Consequently, knowing the voltages that cause drops to follow the two sensor trajectories 47,49** means that all the pixels within a segment can be accurately addressed by charging the droplets to voltages calculated by interpolation. Each drop stream is calibrated in this way to print or place drops at the ideal pixel locations within the line segment within its reach. The drop placement process is then "stitched" since the end pixel positions in adjacent segments each are able to have drops placed on them. The number of sensor sites equals the number of drop streams plus one. Adjacent drop streams share a sensor site but one more sensor than the number of drop streams is needed to provide two sensors for an end drop stream.

The stitching or calibration process need not be performed constantly. The charging voltages affecting aligned flight over the sensors hold steady for periods from seconds to tens of minutes. Consequently, it is adequate to reset or check the charging voltages at intervals. A convenient interval is that provided between completion of printing on one target and the start of printing on another target.

Figure 2:
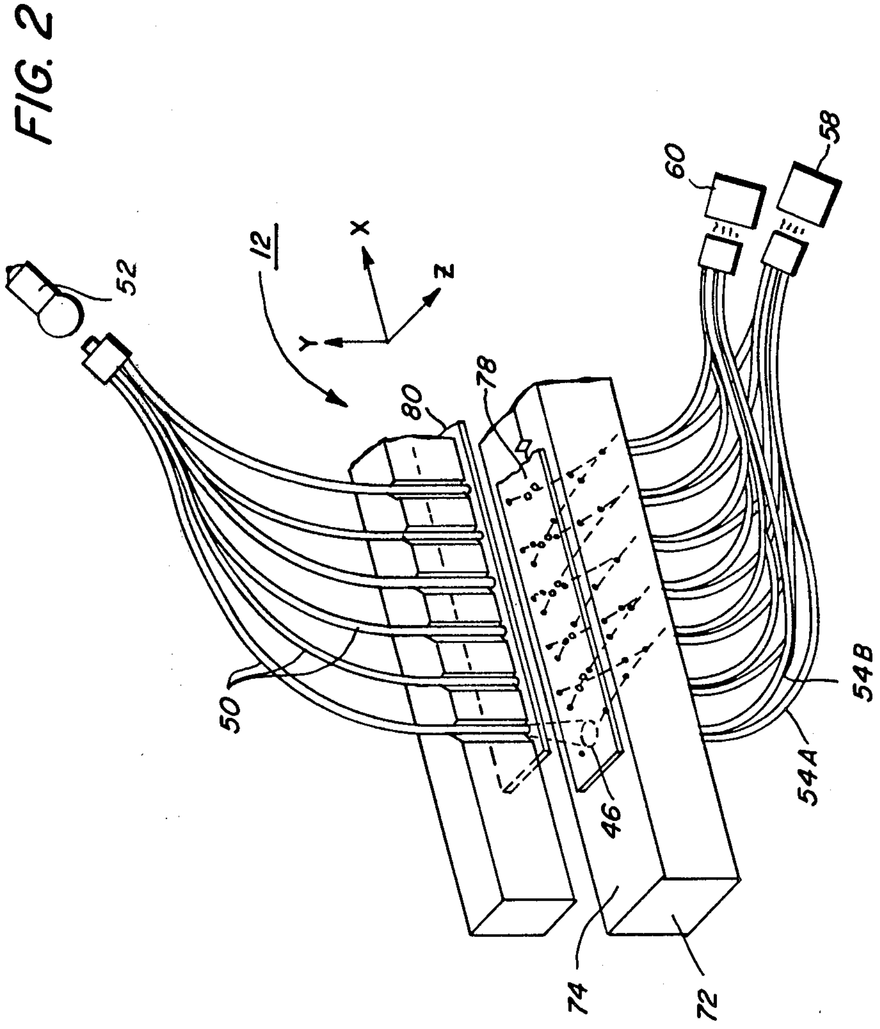
FIG. 2 is a perspective view of a droplet sensing array comprising a portion of the ink jet printer.

FIG. 2 shows the sensor array 12 in perspective and includes the co-ordinate axis defined in FIG. 1. Each sensor site 46 includes a fiber optic input light guide 50 for directing light from a light source 52 and two fiber optic output light guides 54A,54B for directing light to two light detectors 58,60. Other sensor sites across the array 12 also have output light guides coupled to the same sensors 58,60.

Figure 5:
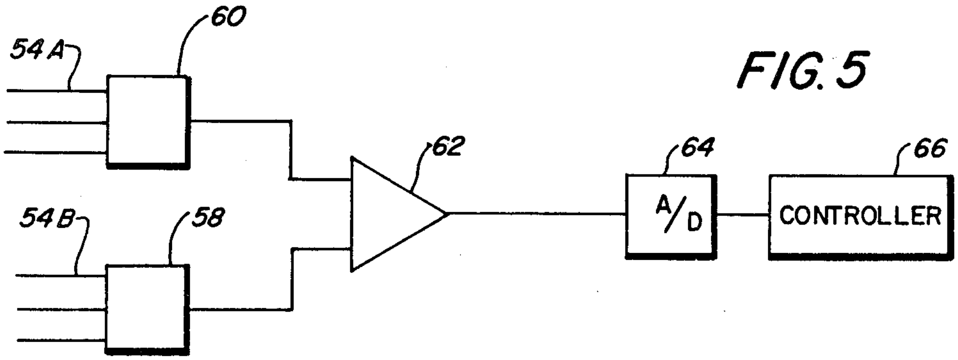
FIG. 5 shows circuitry for analyzing outputs from the sensor array.

Droplets are sensed by measuring the light intensity transmitted by the fibers 54A,54B. When a droplet passes between the input 50 and either of the output fibers 54A,54B comprising one sensor site the intensity of the light transmitted by that fiber is diminished and the output from an associated detector 58,60 also diminishes. The two detectors 58,60 have outputs coupled to an operational amplifier 62 which functions as a difference amplifier (FIG. 5). When no drop is in the sensing zone or when a drop is symmetrically aligned between the two input ends of the A and B fibers, the outputs from the two detectors are equal and the differential amplifier output is zero. When the moving droplets unequally shadow one or the other of the two fibers, however, the differential amplifier output goes either positive or negative depending upon which detector produces the larger output. Further details regarding the method for interpreting outputs from the sensor site may be obtained by referencing the '754 patent to Crean et al.

The differential amplifier output is coupled to an analog to digital converter 64 which in turn presents a digital signal to a printer controller 66. The controller monitors and controls the stitching operations. The controller tests and calibrates each nozzle sequentially, allowing the use of a minimum of two detectors 58,60. The controller calculates voltage values needed to place a droplet at all the pixels within a segment. This calculation is based on the voltages that align the drops over the left and right sensor sites accessable by each stream. These numbers are typically unique for each drop stream and are calculated by interpolation from the voltages needed to deflect droplets over the sensor sites.

Figure 3:
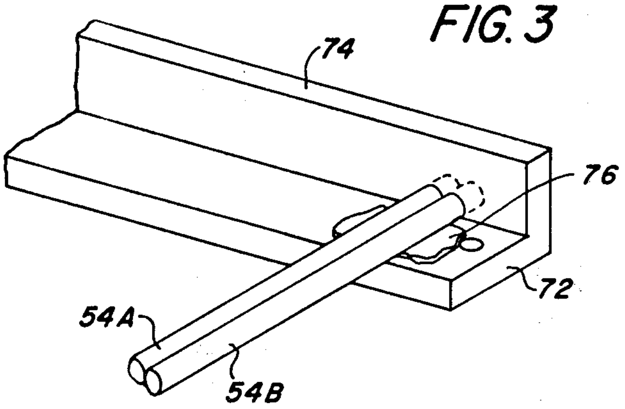
FIG. 3 shows a preferred mounting for optical fibers used in the sensing array.

A typical fiber optic output fiber has a cross sectional diameter in the range 10 to 15 thousandths of an inch. It is desirable, however, to define the optical receive and transmit sites more accurately. It is also desirable to mount the fibers in as efficient yet reliable a manner as possible. FIGS. 2 and 3 show the preferred method of accomplishing those results.

The output fibers 54A,54B are routed through a mounting block or plate 72 with holes or a slot extending therethrough which allow a slide fit of the output fibers 54A,54B. The outer surface 74 includes recesses which allow potting and polishing of the fibers. Once the fibers are in place an epoxy or other suitable potting glue 76 (FIG. 3) provides strain relief to the fibers 54A,54B.

Further definition is given to the sensing sites by two electroformed light masks 78,80 (FIG. 2) which define light transmitted by the input fibers 50 and more specifically define the light receiving sites of the output fibers 54A,54B. The input mask 80 has one light transmitting portion or hole for each input fiber 50 of a cross section about one third to one fourth the fiber cross section.

Figure 4:
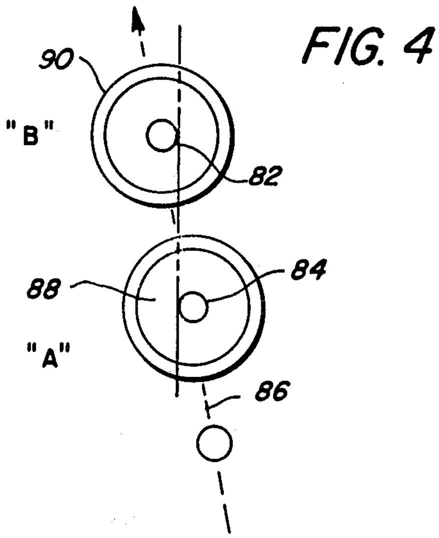
FIG. 4 illustrates one sensing site as defined by an electroformed light output mask.

The arrangement for defining the output portion of the sensing sites is seen in FIG. 4. The electroformed mask 78 defines two light transmitting regions 82,84 (holes) spaced in a direction generally parallel to a typical ink droplet trajectory. The output fibers 54A,54B abut the mask 80 so that only a portion of a fiber core 88 and none of a fiber cladding 90 is exposed to light from the input fiber 50 to that sensing site.

The present sensing site definition method significantly improves the printer. The electroformed metal masks for transmit and receive sites improve the accuracy of the sensing and thus the accuracy of droplet stitching and placement. Use of the precise mask positioning allows non-critical fiber positioning so long as the mask holes cover a portion of the core area of the fibers. In FIG. 4 it is noted that there is zero separation of the receive site boundaries in the drop deflection direction. For any droplet traversing this boundary there will be a maximum gradient of differential signal output which allows precise stitching when compared to prior art sensors which separated the sensing sites along the direction of droplet detection due to the cladding material thickness of the output fibers.

The present invention has been described with a degree of particularity. It is the intent, however, that all modifications or alterations included within the spirit or scope of the appended claims be protected.

We claim:

1. In an ink printer having one or more nozzles for directing one or more ink streams toward a recording medium, apparatus for sensing the presence of individual droplets from said one or more ink streams toward a recording medium, apparatus for sensing the presence of individual droplets from said one or more ink streams in their trajectory toward said medium comprising:

at least one input optical fiber for each nozzle having a first end coupled to a light source, said input optical fiber directing light from said source to an associated planar sensing site from a second end, so that droplets following certain trajectories over the planar sensing site intercept said light;

two output optical fibers being provided for each input optical fiber, the output fibers having receiving ends for receiving light from their associated input optical fiber, the receiving ends of each of the two output fibers being adjacent each other and located in the planar sensing site of their associated input fiber, the receiving ends of the output fibers being positioned in spaced relation to said input fiber second ends, each of said two output fibers having ends opposite the receiving ends which terminate at a separate photodetector, so that changes in light intensity caused by passage of said droplets past said planar sensing sites may be detected; and a mask being interposed between said output fiber receiving ends and the region of ink droplet travel above the planar sensing site to mask light received from the input fiber and define two circular optical receiving sites for each sensing site, one receiving site for each receiving end of the two output fibers and each receiving site having an area less than the receiving ends of the output fibers, the receiving ends of the output fibers abutting said mask, so that only a portion of the output fiber receiving ends is exposed to light directed to that particular sensing site by the input fiber.

2. The apparatus of claim 1, wherein the photodetectors have outputs coupled to a difference amplifier and wherein the two circular optical receiving sites in said mask are positioned for zero dimensional separation of the receiving site boundaries in the drop deflection direction, so that any droplet traversing this boundary provides a maximum gradient of differential signal from the difference amplifier, thus enabling more precise droplet stitching control.

3. In an ink jet printer having multiple nozzles for directing a plurality of ink streams toward a recording medium, apparatus for sensing the presence of individual droplets from said streams as they move toward said medium comprising:

a plurality of light sources mounted across the printer width such that each nozzle has two light sources for sensing droplets as they are deflected away from their initial trajectory, two optical sensing fibers mounted near each of said light sources to collect light from said sources and having input surfaces located so that the droplets may pass between an associated source and said fiber input surfaces, masking means positioned between said input surfaces and said droplets to define a plurality of sensing sites, each site having two transmitting regions spaced from each other along the direction of droplet travel to allow light from a light source to impinge upon one of the two sensing fibers for that sensing site, and means for sensing movement of ink droplets past said sensing sites by detecting changes in the intensity of light transmitting through said sensing fibers.

4. The apparatus of claim 3 which further comprises a mask mounted in close proximity to said light sources including light transmitting regions at each sensing site which limit the area of said light sources and wherein said sources comprise optical fibers coupled to a light emitting diode.

5. The apparatus of claim 3 or 4 which further comprises means for supporting said output optic fibers having an opening through which said fibers extend to a sensing site and including means for limiting moving away from said site while allowing bending and flexing of said fibers.

6. In ink jet printers having multiple nozzles for directing a plurality of ink streams toward a recording medium, a method for sensing the presence of individual droplets from said streams as they move toward said medium comprising the steps of:

mounting two light sources for each nozzle across the printer width for sensing droplets as they are deflected away from their initial trajectory;

directing the light from each of the light sources to a sensing site;

collecting the light from the light sources at the sensing site by two optical sensing fibers at each sensing site, the optical sensing fibers having input surfaces locates so that the droplets may pass between an associated light source and said fiber input surfaces;

positioning a masking means having two circular passages therethrough for each light source between said input surfaces and said droplets to define two transmitting regions spaced from each other along the direction of droplet travel to allow light from one of the light sources to pass through said circular passages in the masking means and impinge upon the two sensing fibers for that sensing site, each of the two input surfaces of said sensing fibers abutting a respective one of the circular passages in the masking means, and each circular passage having a smaller area than its associated sensing fiber input surface; and sensing the movement of the ink droplets which pass said sensing sites by detecting changes in the intensity of light transmitted through said circular passage and said sensing fibers.

* * * * *